United States Patent [19]
Peyrot

[11] 3,782,740
[45] Jan. 1, 1974

[54] CENTERING CHUCK
[76] Inventor: Jean-Pierre Peyrot, 1, avenue de la Division du general Leclerc, Villejuif, France
[22] Filed: Aug. 16, 1971
[21] Appl. No.: 171,875

[30] Foreign Application Priority Data
Aug. 21, 1970 France .................. 7030820

[52] U.S. Cl. .................. 279/2, 279/22
[51] Int. Cl. ........................ B23b 31/40
[58] Field of Search ............ 279/2, 22; 82/44; 269/48.1

[56] References Cited
UNITED STATES PATENTS
2,499,781  3/1950  Rothenberger .......... 279/2
3,100,117  8/1963  Schneider et al. ........ 279/2

FOREIGN PATENTS OR APPLICATIONS
493,375  12/1920  France ................ 82/44

Primary Examiner—Gil Weidenfeld
Attorney—Karl W. Flocks

[57] ABSTRACT

Tool-carrying centering chuck in which two mobile sleeves along a tube are urged towards one another against a central sleeve by antagonistic or counter springs, the facing conical lateral surfaces of said sleeves being designed to receive bearing balls and to push them outwardly against the inner surface of a tube to be treated during a welding or circular machining operation without mounting on a lathe being necessary.

5 Claims, 3 Drawing Figures

PATENTED JAN 1 1974 3,782,740

Inventor:
Jean-Pierre Peyrot
By
Karl W. Flocks

CENTERING CHUCK

The present invention relates to a centering chuck and, more particularly to an expansible cartridge or case capable of centering perfectly inside tubes of a certain range of dimensions, at least two sets of ball bearings enabling the chuck to rotate freely inside the tube, a coupling device being provided to fix onto the chuck a tool-holder plate designed to ensure a circular operation in rotation around the tube.

The invention also provides:

a centering chuck comprising a central sleeve and two end sleeves connected rigidly by a central pin, an intermediate sleeve being provided between each end sleeve and the center sleeve, facing conical surfaces being provided on the central sleeve and the intermediate sleeves to push the bearing balls of two ball bearings outwards.

a centering chuck of this type in which antagonistic or counter springs are provided between said end sleeves and the intermediate sleeves.

an expansible case or cartridge suitable for a certain range of tube diameters.

Other characteristics and advantages will become evident from the description that is to follow, made with respect to the attached drawing and describing an indicative, but in no way limitative, form of embodiment of the invention.

Figure 1:
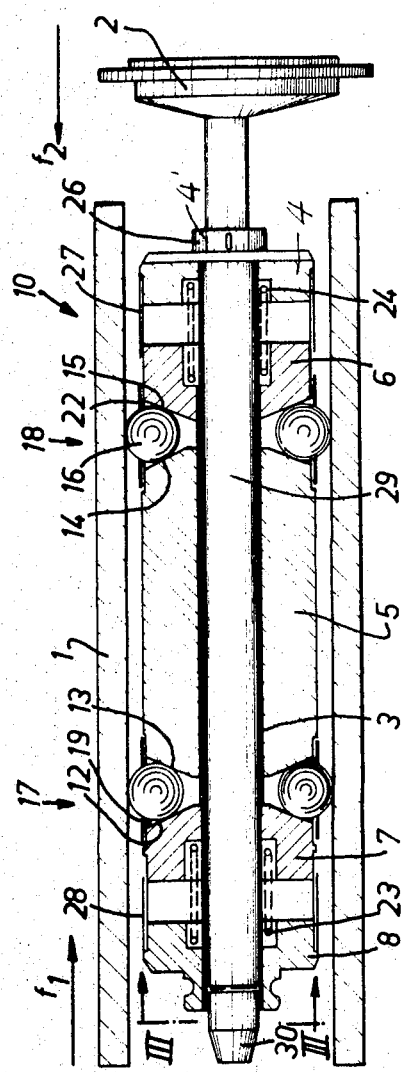
FIG. 1 is an axial cross section of a centering chuck according to the invention.
Figure 2:
FIG. 2 is a similar view of a chuck provided for another range of tubes.

FIG. 1 shows a centering chuck 10 designed to center in rotation in a tube 1 a working tool (not represented) integral with a plate 2, which may be rendered integral with spindle or a pin 29 with an end 30 in the shape of a trunkated cone fitted in said centering chuck 10.

Chuck 10 includes a tubular lining 3 integral with a first end sleeve or ring 4 and on which are fitted a central sleeve 5, two intermediate sleeves 6 and 7 and a second end sleeve 8 secured to tubular lining 3 by a spring pin 9 the two arms of which are engaged in two grooves, canals, nicks or cuts 11 of pin 29.

Facing conical surfaces 12, 13, 14 and 15 are provided with ball bearing units 17 and 18, each of which includes a pair of ball bearings 16, which are retained inside their respective recess or seat by means of rings 19 and 22, pierced with a hole for each ball bearing 16. Two helical springs 23 and 24 seated or situated around tubular lining 3 between each end sleeve and the corresponding intermediate sleeve urge or bias the conical walls 12 and 15 respectively in the direction of arrows $f_1$-$f_2$. This effort or stress tends to push back ball bearings 16 onto walls 13 and 14 with a resulting outward movement against the inner wall of tube 1.

Within a certain range, generally limited, for example, by a predetermined allowance clearance or play of play of ball bearings 16, the chuck 10 may be used for tubes of different diameters of a certain range. A chuck 100 of another size is provided for another range of tubes, and thus with a limited number of centering chucks (or cartridges) it is possible to center a working tool fixed on a plate 2 integral with a pin 29 inside a whole series of tubes of various diameters, owing to the central positioning of the main pin 29 inside bearing ball cartridge 10, which is itself centered in tube 1 which it fits, as already seen, as regards a certain range of inside diameters.

Locking after introduction of the pin 29 inside the cartridge 10 is ensured by a double spring pin 9 the free ends of which are, prior to mounting, introduced into orifices 25 of parts 3 and 8.

The two arms of spring pin 9 spread or separate on passing over the conical part 30 of the pin 29 when the latter is introduced into the cartridge or case, and then sharply snap into place by a spring effect in grooves or canals 11 of the shaft 29, subsequently preventing any axial movement of the cartridge or case.

The unlocking operation is effected very simply by means of a flat spanner which is fitted onto the two flats 26 formed on an extension 4 of the ring 4.

Figure 3:
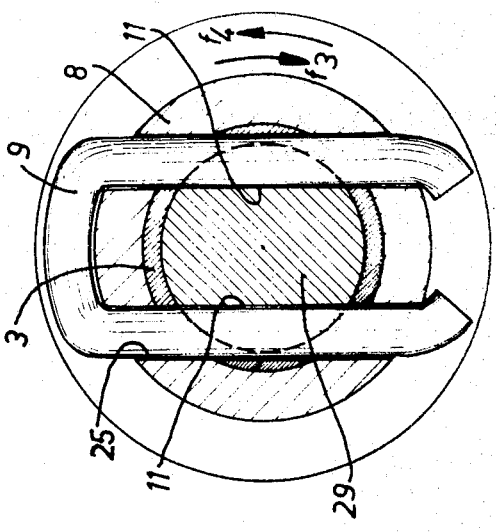
FIG. 3 is a cross section along line III—III of FIG. 1.

As a rotary movement is transmitted to this ring 4 in the direction of $f_3$ and $f_4$, the ring 4 drives with tubular lining 3 and end sleeve 8 (FIG. 3).

Pin 29 being kept immobile, the arms of spring pin 9 escape from the nicks or cuts 11 and it is then easy to axially disengage pin 29 from the chuck 10.

It can be seen that it is easy to mount the constituent parts of a chuck according to the invention by means of very simply shaped or formed basic elements. The sliding protective rings 27 and 28 are first of all positioned on the end sleeves, as well as locking rings 19 and 22 of the ball bearing on the central sleeve. The spring 24, sleeve 6, the ball bearings 16 of ball bearing unit 18, the central sleeve 5, the ball bearings of ball bearing unit 17, the sleeve 7, the spring 23 and the end sleeve 8 are successively fitted in the appropriate order and position on tubular lining 3 crimped in sleeve 4; all parts are compressed including springs 23 and 24 and the tubular lining 3 is crimped on the ring 8.

A tool fitted onto a chuck according to the invention makes it possible for example to effect a machining, welding or inspection or control operation in precise rotation around the axis of a tube without bench mounting and dismounting operations being necessary.

It is understood that the present invention has been described above as an explicative, but in no way limitative, example and that it will be possible to introduce any equivalent means into its constituent elements without departing from the scope defined by the attached claims.

I claim:

1. Chuck arrangement for effecting centering relationship of various parts within a tubular part to be treated comprising a tubular lining with a first sleeve disposed therearound, second and third sleeves movably disposed around said tubular lining on opposite sides of said first sleeve, said first and second sleeves and said first and third sleeves having adjacent conical lateral faces between which are disposed at least two ball bearings, spring means urging said second and third sleeves toward one another and against said first sleeve and causing said lateral faces to push said ball bearings outwardly against surrounding inner wall portions of a tube to be treated.

2. The chuck arrangement according to claim 1 wherein the ball bearings are limited in their outward movement by locking rings disposed around said first, second and third sleeves and extending axially beyond said conical lateral faces.

3. The chuck arrangement according to claim 1 wherein a first end sleeve is disposed around a first end of said tubular lining and crimped thereto, said second and third sleeves are in sliding relationship toward and away from said first sleeve therebetween, and a second end sleeve is disposed around the other end of said tubular lining and keyed or locked thereto.

4. The chuck arrangement according to claim 3 wherein sliding protective rings are disposed around said first end sleeve and said second sleeve and around said second end sleeve and said third sleeve.

5. The chuck arrangement according to claim 4 wherein said second end sleeve and said tubular lining are detachably secured to a pin element disposed in said tubular lining by a generally U-shaped spring member with arm portions disposed in aligned orifice means of said second end sleeve and tubular lining and groove means of said pin element and said chuck may be detached from said pin element by rotary motion applied to two flats or bearings formed on said first end sleeve, for example, by application of a spanner which would rotate said second end sleeve and said tubular lining with respect to said pin element to spread and raise said arm portions of the spring member out of the groove means of said pin element.

* * * * *